(12) United States Patent
Yagihashi et al.

(10) Patent No.: US 6,721,756 B2
(45) Date of Patent: Apr. 13, 2004

(54) DEVICE, METHOD, SYSTEM, AND PROGRAM FOR EXECUTING QUESTIONNAIRE PROCESS FOR A CLIENT

(75) Inventors: Toshio Yagihashi, Tokyo (JP); Shunichi Satou, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 249 days.

(21) Appl. No.: 09/839,228

(22) Filed: Apr. 23, 2001

(65) Prior Publication Data

US 2001/0039507 A1 Nov. 8, 2001

(30) Foreign Application Priority Data

Apr. 24, 2000 (JP) ........................... 2000-123233

(51) Int. Cl.[7] ............................................... G06F 17/30
(52) U.S. Cl. ..................................... 707/102; 707/104.1
(58) Field of Search ............................... 707/102, 104.1

(56) References Cited

U.S. PATENT DOCUMENTS

| | | | | |
|---|---|---|---|---|
| 5,802,493 A | * | 9/1998 | Sheflott et al. ................. | 705/1 |
| 6,067,523 A | * | 5/2000 | Bair et al. ....................... | 705/3 |
| 6,112,049 A | * | 8/2000 | Sonnenfeld .................... | 434/350 |
| 6,289,513 B1 | * | 9/2001 | Bentwich ...................... | 717/106 |
| 6,356,909 B1 | * | 3/2002 | Spencer ........................ | 707/10 |
| 6,421,652 B2 | * | 7/2002 | Loeb et al. .................... | 705/14 |
| 6,539,392 B1 | * | 3/2003 | Rebane ......................... | 707/101 |
| 2002/0010620 A1 | * | 1/2002 | Kowalchuk et al. .......... | 705/10 |

FOREIGN PATENT DOCUMENTS

| | | |
|---|---|---|
| JP | H8-292937 A | 11/1996 |
| JP | H11-282828 A | 10/1999 |

OTHER PUBLICATIONS

Makoto Sonoda, "Web programming that anyone can do, No. 14: Let's make a questionnaire survey system!" Nikkei Software, Nikkei BP–sha, Apr. 7, 2000, vol. 3, No. 5, pp. 124–133.

* cited by examiner

*Primary Examiner*—Wayne Amsbury
(74) *Attorney, Agent, or Firm*—Sughrue Mion, PLLC

(57) ABSTRACT

A client terminal sends a request signal representing contents of a questionnaire to an agent server, in accordance with operations of a client. The agent server sets target people to be provided with the questionnaire, in accordance with the contents of the questionnaire represented by the request signal sent from the client terminal through a network. The agent server creates a plurality of questions in accordance with the contents of the questionnaire which are represented by the request signal. The agent server sends the created questions to the set target people through a network. After this, the agent server sums up completed questionnaires sent back from the target people through a network. The agent server sends the summed result to the client terminal through a network, thereby to provide the summed result to the client.

13 Claims, 8 Drawing Sheets

| USER ATTRIBUTE | | | | |
|---|---|---|---|---|
| NAME | AGE | RESIDENTIAL AREA | SEX | EMAIL ADDRESS |
| A. MILLER | 40'S | MANHATTAN | FEMALE | abc@xyz.com |
| B. WILLEY | 10'S | NEW YORK | MALE | efg@vwx.com |
| C. CLIFFS | 20'S | HAMILTON | MALE | jkl@stu.com |
| D. BUBOIS | 30'S | LONDON | FEMALE | klm@lmn.com |
| E. GIBSON | 20'S | MANHATTAN | MALE | rst@hij.com |
| . . . | . . . | . . . | . . . | . . . |

FIG.3

REQUEST PAGE

INPUT BACKGROUND CONTENTS OF QUESTIONNAIRE

| | |
|---|---|
| PRODUCT CONCERNED : | PERSONAL COMPUTER |
| TARGET PEOPLE : | MALE AND FEMALE OF AGE GROUPS 10'S TO 70'S IN RESIDENTIAL AREAS OF "AAA" AND "BBB" |
| RESEARCH CONTENTS : | RESEARCH ON RECENT USAGE CONTEXT OF PERSONAL COMPUTER |

AFTER COMPLETION OF INPUTTING, CLICK "SEND"

SEND

FIG.4A

REPORTING PAGE

BACKGROUND CONTENTS : SURVEY OF RECENT USAGE
OF QUESTIONNAIRE        CONTEXT OF PERSONAL COMPUTER
AREA : MANHATTAN
TARGET AGE GROUP(S) : 10'S TO 70'S
SEX : MALE AND FEMALE

MODEL OF COMPUTER

PURPOSE

| QUESTIONS | |
|---|---|
| MODEL | 1. xxx MANUFACTURE |
| | 2. yyy MANUFACTURE |
| | 3. zzz MANUFACTURE |
| | ⋮ |
| PURPOSE | 1. INTERNET |
| | 2. EMAIL |
| | 3. GAME |
| | 4. OTHERS |
| USAGE HOUR(S) | 1. 0~10H |
| | 2. 10~20H |
| | 3. 20~30H |
| | ⋮ |
| AGE | 1. 10'S |
| | 2. 20'S |
| | 3. 30'S |
| | ⋮ |
| SEX | 1. MALE |
| | 2. FEMALE |
| EVALUATION | 1. EXCELLENT |
| | 2. GOOD |
| | 3. FAIR |
| | ⋮ |

FIG.7

DEVICE, METHOD, SYSTEM, AND PROGRAM FOR EXECUTING QUESTIONNAIRE PROCESS FOR A CLIENT

BACKGROUND OF THE INVENTION

1. Field of the Invention

The present invention relates to a device, method, system, and program for executing a questionnaire process for a client (a client company).

2. Description of the Related Art

Conventionally, in terms of a questionnaire process, human users have done various processes, such as selecting of target people to be provided with a questionnaire, sending of the questionnaire to each of the target people, summing up of returned questionnaires, etc.

In different questionnaire processes, operations have separately been done. Hence, the more the number of cases, the more the number of human operators and the longer the time necessary for performing the questionnaire process. Under such circumstances, the contents of the questionnaire and the target people may not fairly be set by the human operators. This fails in a reliable survey of the target people's behavior.

SUMMARY OF THE INVENTION

It is according an object of the present invention to provide a device, system, method and program for reliably executing a questionnaire process for a client in a short period of time.

In order to accomplish the above object, according to the first aspect of the present invention, there is provided an agent device, for executing a questionnaire process for a client, comprising:

a setting unit which sets target people to be provided with a questionnaire, in accordance with contents of the questionnaire which are requested by the client and sent through a network;

a question maker which makes at least one question toward the target people set by the setting unit, in accordance with the contents of the questionnaire;

a questioner which sends the at least one question made by the question maker to the target people through the network;

a summing unit which sums up completed questionnaires sent from the respective target people through the network; and a provider which provides the client with a sum result of the completed questionnaires through the network.

According to this invention, a questionnaire process can be achieved in a short period of time.

The setting unit may include:

a condition determiner which determines at least one condition for setting the target people to be provided with the questionnaires, in accordance with the contents of the questionnaire; and a target-people determiner which determines the target people, in accordance with the at least one condition determined by the condition determiner.

The target-people determiner may set a code, for identifying each of the determined target people, to each of the target people; and the summing unit may perform accurate summing of the completed questionnaires, by checking, with the code, whether there is a person having done an improper act.

The agent device may further comprise a memory which stores, as data, at least one attribute of a person to be set as one of the target people, and the condition determiner may determine, as a condition, the at least one attribute of the target people, in accordance with the contents of the questionnaire, and the target-people determiner may determine a predetermined number of people as the target people, of people corresponding to the condition determined by the condition determiner, using the data stored in the memory.

In order to accomplish the above object, according to the second aspect of the present invention, there is provided a method for executing a questionnaire process for a client, the method comprising:

setting target people to be provided with a questionnaire, in accordance with contents of the questionnaire which are requested by the client and sent through a network;

obtaining at least one question corresponding to the contents of questionnaire, from a plurality of questions stored in advance in a memory;

sending data representing the obtained question to a predetermined terminal through a network, thereby to question the set target people;

summing up completed questionnaires using data representing the completed questionnaires sent from the target people through a network; and sending data representing a summed result of the completed questionnaires to a predetermined terminal through a network, thereby to provide the summed result to the client.

The setting may include:

determining at least one attribute, as a condition, of the set target people, in accordance with the contents of the questionnaire; and sampling a predetermined number of people, as the target people, from a plurality of people having an attribute corresponding to the condition, using attribute information representing attributes of the plurality of people and stored in advance in a memory.

The sampling may include setting a code, for identifying each of the target people, to each of the target people; and the summing may include performing accurate summing of the completed questionnaires, by checking, with the code, whether there is a person having done an improper act.

In order to accomplish the above object, according to the third aspect of the present invention, there is provided an agent system for executing a questionnaire process for a client, comprising:

an agent device which serves as an agent for executing the questionnaire process for the client; and a request device which sends a request signal representing contents of a questionnaire which are requested by the client to the agent device, and wherein the agent device includes a setting unit which sets target people to be provided with a questionnaire, in accordance with contents of the questionnaire represented by a request signal sent from the request device through a network;

a question maker which makes at least one question toward the target people set by the setting unit, in accordance with the contents of the questionnaire;

a questioner which sends the at least one question made by the question maker to the target people set by the setting unit through the network;

a summing unit which sums up completed questionnaires sent from the target people through a network; and a provider which provides the request device with a summed result of the completed questionnaires through the network.

The system may further comprise a controller which controls an account of the client and an account of an agent which owns the agent device, and wherein:

the request device includes a sending unit which sends a transfer signal for instructing to transfer rates for the questionnaire process to the controller from the account of the client to the account of the agent, in response to the summed result sent from the provider; and the controller transfers the rates from the account of the client to the account of the agent, in accordance with the transfer signal sent from the sending unit.

In order to accomplish the above object, according to the fourth aspect of the present invention, there is provided a program for controlling a computer to function as an agent device, for executing a questionnaire process for a client, comprising:

a setting unit which sets target people to be provided with a questionnaire, in accordance with contents of the questionnaire which are requested by the client through a network;

a question maker which makes at least one question toward the target people set by the setting unit, in accordance with the contents of the questionnaire;

a questioner which sends the question made by the question maker to the target people set by the setting unit through the network;

a summing unit which sums up completed questionnaires sent respectively from the target people through the network; and a provider which provides the client with a summed result obtained by the summing unit through a network.

BRIEF DESCRIPTION OF THE DRAWINGS

The object and other objects and advantages of the present invention will become more apparent upon reading of the following detailed description and the accompanying drawings in which:

FIG. 3 is a diagram showing attribute data which is stored in a storage section included in the agent server of FIG. 2;

FIG. 4A is a diagram showing a request page for inputting desired contents of questionnaires.

FIG. 7 is a diagram showing a list of questions created by the CPU included in the agent server shown in FIG. 2.

DETAILED DESCRIPTION OF THE PREFERRED EMBODIMENT

An agent system, for executing a questionnaire process for a client, according to an embodiment of the present invention will now be described with reference to the accompanying drawings.

Figure 1:
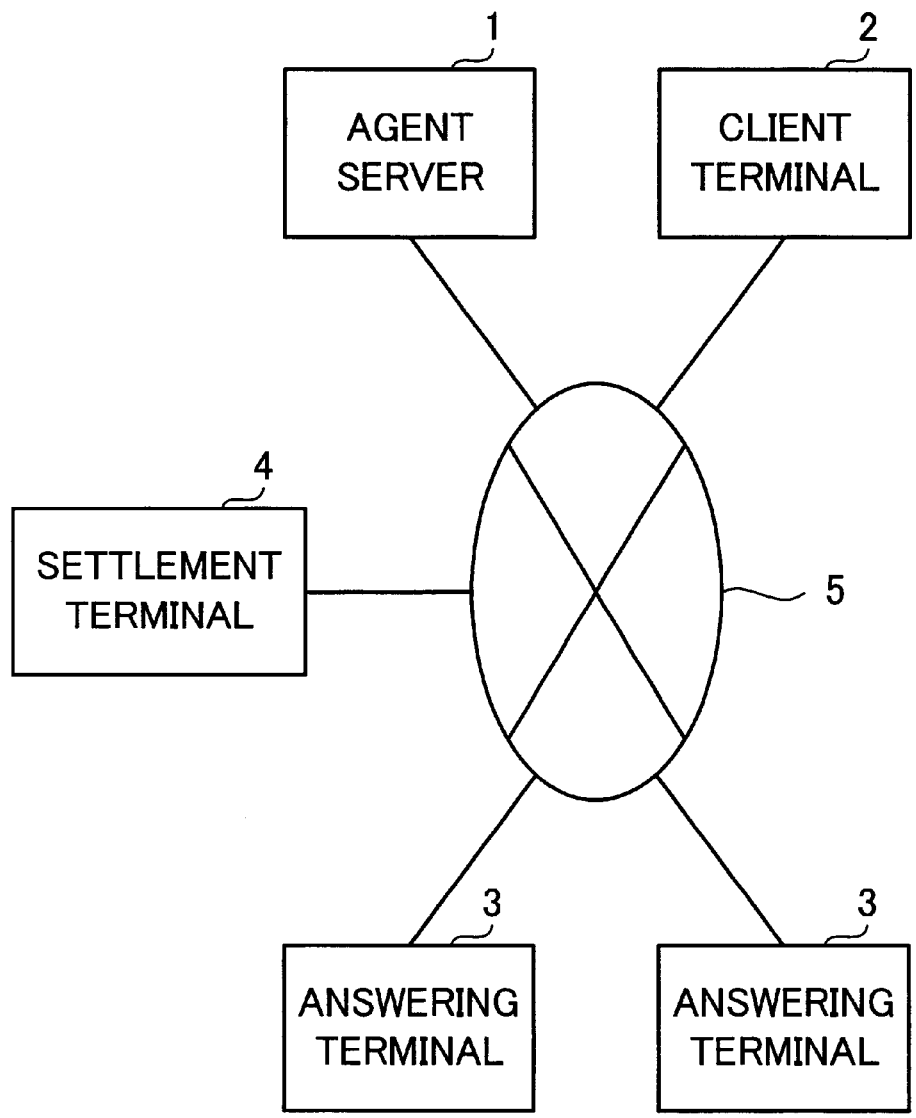
FIG. 1 is a diagram showing the structure of an agent system, for executing a questionnaire process for a client, according to an embodiment of the present invention.

The agent system for executing a questionnaire process for a client, according to the embodiment of the present invention, comprises an agent server 1, a client terminal 2, an answering terminal 3, a settlement terminal 4, and a network 5, as shown in FIG. 1.

The agent server 1, the client terminal 2, the answering terminal 3, and the settlement terminal 4 are connected with each other through the network 5, such as the Internet, etc.

The agent server 1 is prepared in an agency which handles those tasks necessary for providing questionnaires for a client (a client company). The agent server 1 sets target people to be provided with a questionnaire, in response to a request signal which is sent from the client terminal 2 of the client company. The request signal represents the contents of a questionnaire. The contents of a questionnaire includes a product concerned, target people who possess the product, and specific research contents, etc. The agent server 1 provides each of the target people with a questionnaire in the form of, for example, an email. The agent server 1 sums up the completed questionnaires, and sends a summed result to the client terminal 2 through the network 5. The structure of the agent server 1 will more specifically be described later.

The client terminal 2 sends, to the agent server 1 through the network 5, a request signal representing the contents of a questionnaire to be consigned to the agent, in accordance with operations of the client (or a person who is responsible for questionnaire processing in the client company). In response to the summed result of the questionnaires sent from the agent server 1, the client terminal 2 creates data necessary for transferring the rates for the questionnaire process from an account of the client to an account of the agent, and sends the created data to the settlement terminal 4 through the network 5. The client terminal 2 displays the summed result of the questionnaires on a display, etc., thereby to show the result to the client (the person who is responsible for the questionnaire processing). The structure of the client terminal 2 will more specifically be described later.

The answering terminal 3 is a computer which is connected to the network 5, and includes one or more answering terminals 3. In FIG. 1, two answering terminals 3 are illustrated by way of example. The target people to be provided with a questionnaire are selected from a plurality of users of the answering terminals 3 by the agent server 1. The answering terminal 3 receives an email representing the questionnaire from the agent server 1, and sends an email representing a completed form of the questionnaire to the agent server 1 in accordance with the operations of a corresponding target person (user of the answering terminal 3).

The settlement terminal 4 is prepared in a financial institution, such as a bank, etc. The settlement terminal 4 manages the account of the agent and the account of the client. The settlement terminal 4 transfers the rates for the questionnaire process from the account of the client to the account of the agent, based on the created data sent from the client terminal 2 through the network 5.

The structure of the agent server 1 will now specifically be explained.

Figure 2:
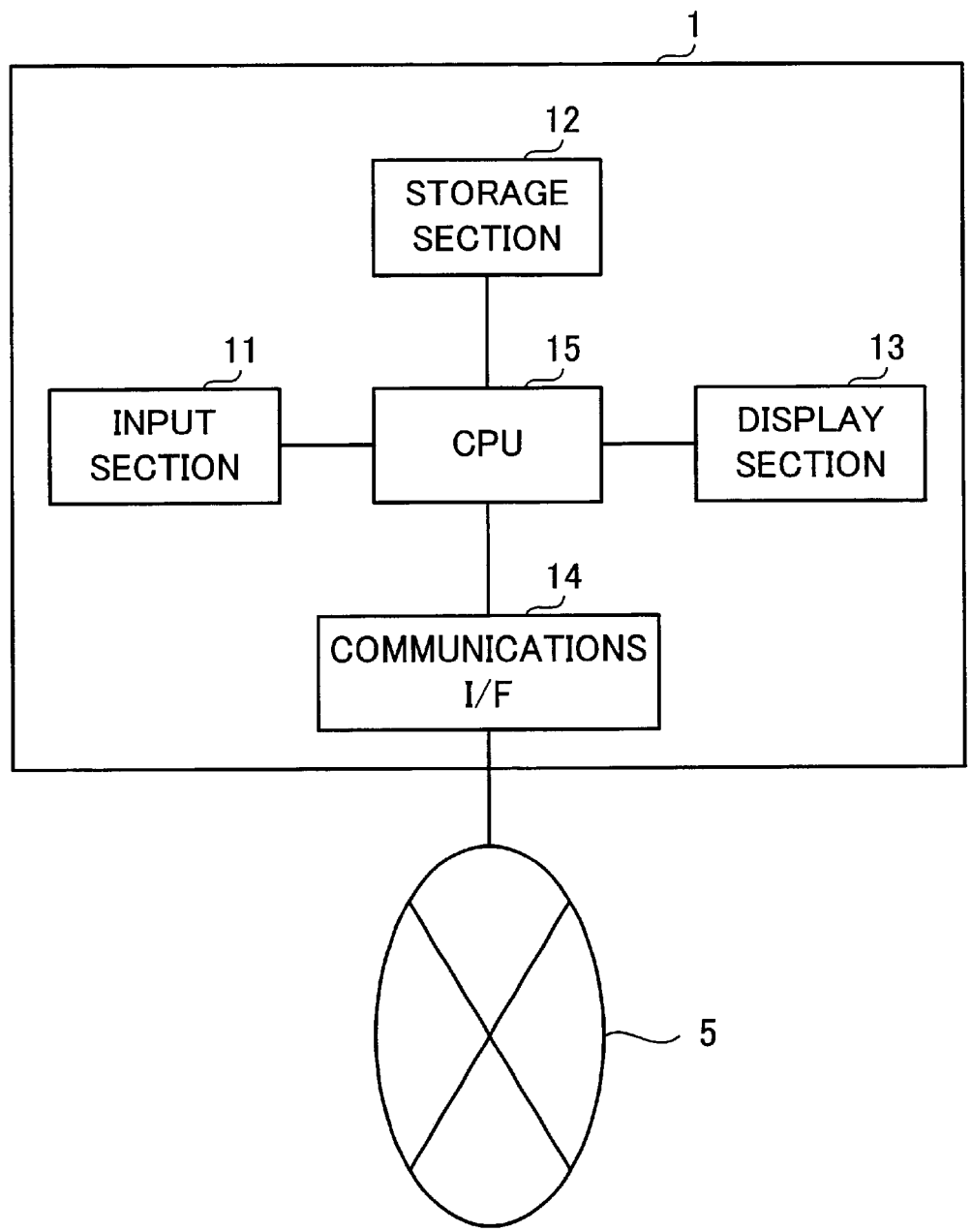
FIG. 2 is a diagram showing the structure of an agent server included in the agent system shown in FIG. 1.

The agent server 1 comprises, as illustrated in FIG. 2, an input section 11, a storage section 12, a display section 13, a communications interface (I/F) 14, and a CPU (Central Processing Unit) 15.

The input section 11 includes a keyboard and/or a touch panel, etc. The input section 11 is operated by an operator of the agency, so that the operational environment of the agent server 1 can be set.

The storage section 12 includes a RAM (Random Access Memory), a ROM (Read Only Memory), etc., and stores a program and data for operating the agent server 1. For example, the storage section 12 stores various questions included in a questionnaire, as data. The storage section 12 stores attribute data and page data, etc., as will be explained below.

The attribute data includes attributes of each user of the answering terminal 3 which can be accessed by the agent server 1, i.e. each user as a target person to be provided with a questionnaire. The attributes of each user includes, as shown in FIG. 3, "Name", "Age", "Residential Area", "Sex", and "Email Address".

The page data is included in a request page for requesting execution of a questionnaire process and a reporting page for reporting a result of completed questionnaires. Both pages are displayable and retrievable by a browser (such as a Web (World Wide Web) browser, etc.).

The request page is one for requesting an agent to execute the questionnaire process for the client, and displayed on a display of the client terminal 2, as shown in FIG. 4A. The client operates the client terminal 2, inputs the contents of the questionnaire in the request page, and sends the request page so as to request the agent to execute the questionnaire process for the client.

Figure 4B:
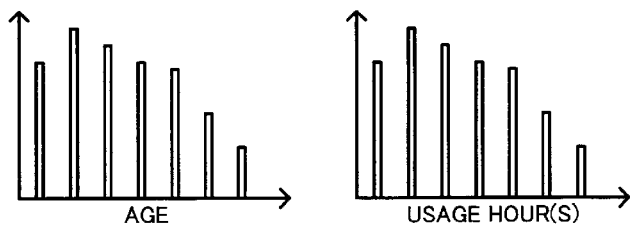
FIG. 4B is a diagram showing a reporting page for reporting results of completed questionnaires.
Figure 4B:
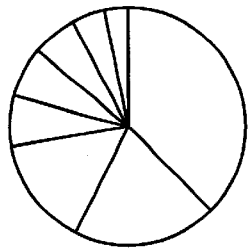
Figure 4B:
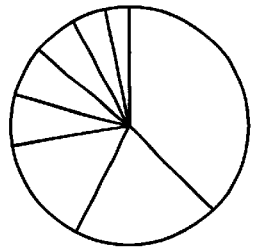

The reporting page is one for reporting a result of completed questionnaires, and displayed on the display of the client terminal 2, as shown in FIG. 4B.

The display section 13 includes a liquid crystal display, or the like. The display section 13 displays the operational context of the agent server 1 and a set screen of the agent server 1.

The communications I/F 14 connects the CPU 15 to the network 5.

The CPU 15 includes a micro-processor, etc., executes and handles the questionnaire process, in accordance with the program and data stored in the storage section 12. Operations which are performed by the CPU 15 will more specifically be described later.

The structure of the client terminal 2 will now specifically be described.

Figure 5:
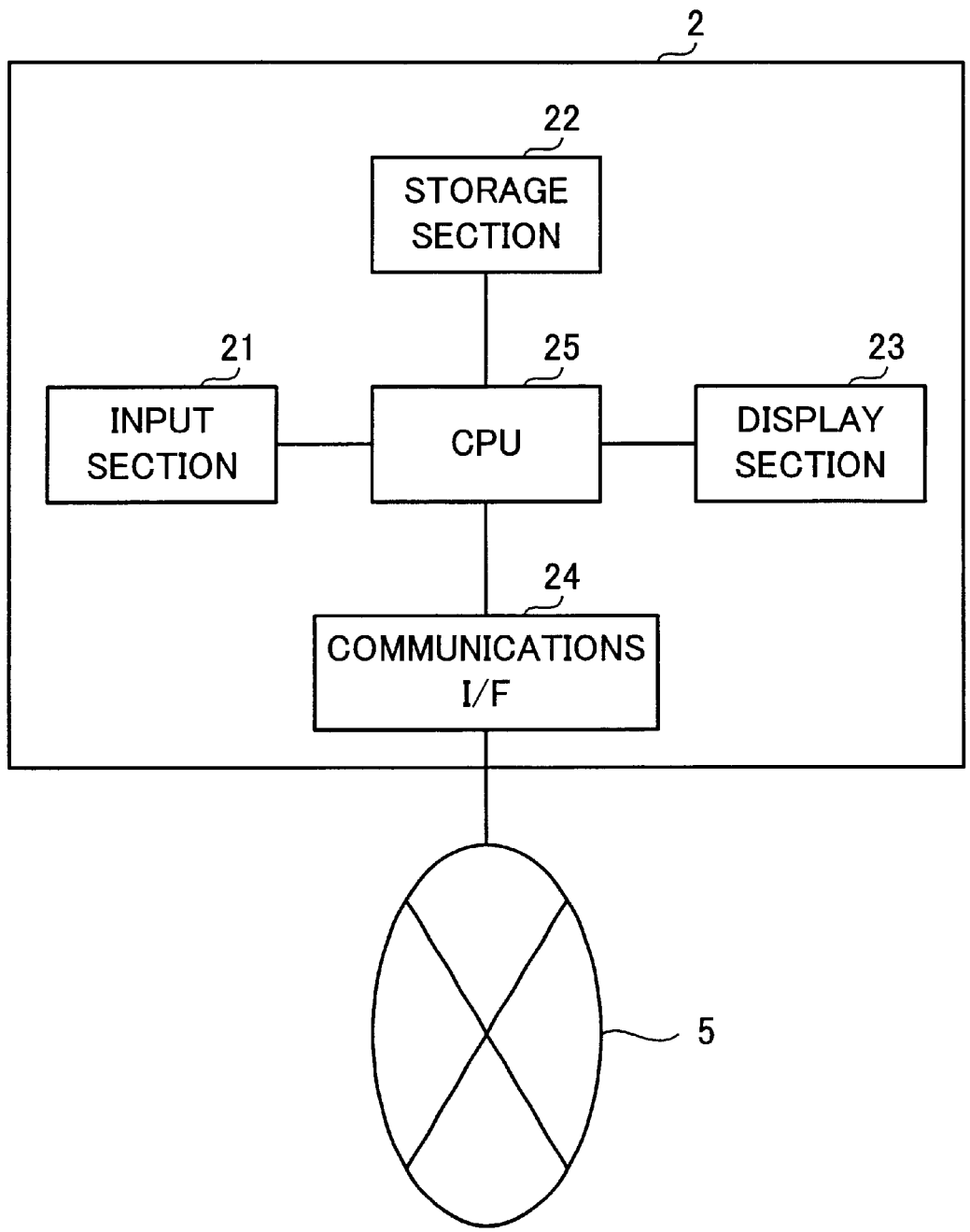
FIG. 5 is a diagram showing the structure of a client terminal included in the agent system of FIG. 1.

As shown in FIG. 5, the client terminal 2 comprises an input section 21, a storage section 22, a display section 23, a communications I/F 24, and a CPU 25.

The input section 21 includes a keyboard and/or a touch panel, etc., and is operated by the client (or the person who is responsible in the client company).

The storage section 22 includes a RAM, a ROM, etc., and stores a program and data for operating the client terminal 2. For example, the client terminal 22 stores a program and data for activating a Web browser for displaying the request page and the reporting page.

The display section 23 includes a liquid crystal display, etc. The display section 23 displays the request page and the reporting page with a predetermined browser.

The communications I/F 24 connects the CPU 25 to the network 5.

The CPU 25 controls the operations of each section included in the client terminal 2, in accordance with the program and data stored in the storage section 22. Operations of the CPU 25 will more specifically be described later.

Operations of the questionnaire agent system having the so-far described structure will now be explained.

When to request the agent to handle the questionnaire process for the client, the client (or the person who is responsible for the questionnaire process in the client company) operates the client terminal 2 so as to access the agent server 1.

Upon accessing the agent server 1 from the client terminal 2, the CPU 15 of the agent server 1 receives data of the request page from the storage section 12, and sends the received data of the request page to the client terminal 2.

The CPU 25 of the client terminal 2 receives the data of the request page from the agent server 1, and controls the display section 23, so as to display the request page shown in FIG. 4A.

The client operates the input section 21, and inputs the contents (such as a product concerned, target people who possess the product concerned, specific research contexts, etc.) of the questionnaire onto the request page. For example, the client inputs some information including "Personal Computer" as a product concerned, "Male" and "Female" in the residential areas of "AAA" and "BBB" as target people, and "Research on Recent Usage Context of Personal Computer" as specific research contents. Then, the client clicks on a button "Send" which is prepared in the request page.

Upon clicking the button, the CPU 25 sends a request signal representing the contents of the questionnaire which are input by the client to the agent server 1.

Figure 6:
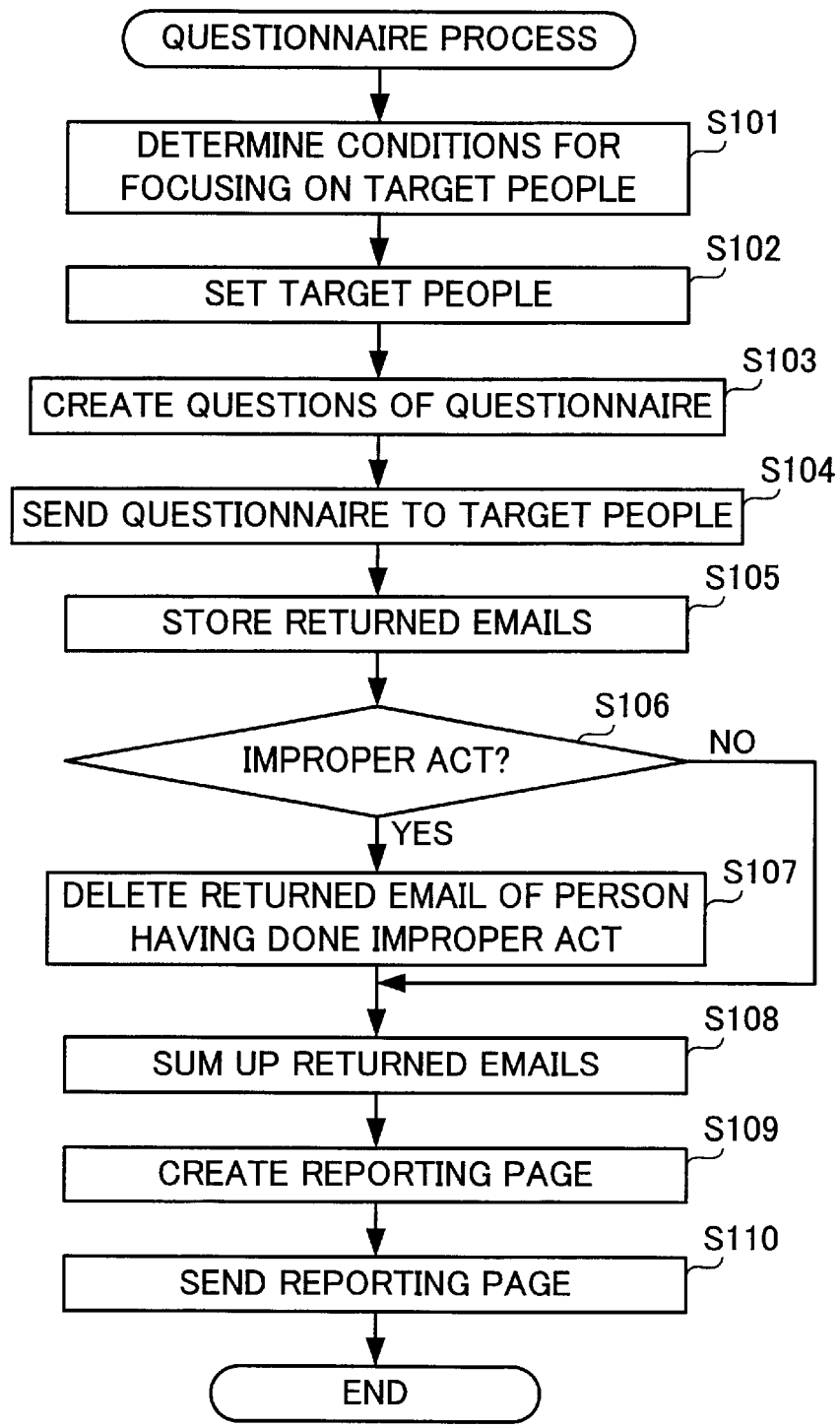
FIG. 6 is a flowchart for explaining a questionnaire process carried out by a CPU included in the agent server shown in FIG. 2.

In response to the request signal sent from the client terminal 2, the CPU 15 of the agent server 1 carries out a questionnaire process shown in FIG. 6, in accordance with the program and data stored in the storage section 12. Before executing the questionnaire process, the CPU 15 may send rate information representing the rates for the questionnaire process to the client terminal 2, so as to show the rates to the client.

The CPU 15 determines conditions for focusing on target people to be provided with a questionnaire, based on the contents of the questionnaire represented by the request signal (Step S101).

Specifically, the CPU 15 determines attributes (age, residential area, sex, and the like) of the target people to be provided with the questionnaire, based on the contents of the questionnaire. For example, in the case of providing questionnaires concerning a product beyond the boundaries of sex and age, the CPU 15 determines "All Age Groups", "Male" and "Female", as the attributes of the target people to be provided with the questionnaires, of the entire users. On the contrary, in the case of providing questionnaires concerning a product intended only for either male or female users, the CPU 15 determines either "Male" or "Female" as the attribute of the target people. Additionally, in the case of providing questionnaires concerning a product intended only for a certain age group of users, the CPU 15 determines the certain age group as the attribute of the target people.

After this, the CPU 15 randomly selects a predetermined number of users, of the users corresponding to the conditions (the attributes) determined in the step S101, based on the attribute data stored in the storage section 12, and sets the selected users as target people to be provided with the questionnaire (Step S102). Particularly, the CPU 15 randomly extracts, from the attribute data, user names and their email addresses corresponding to those attributes which coincide with the conditions determined in the step S101. At this time, the CPU 15 affixes an identifier (code), for identifying each of the target people, to each of the target people.

After setting the target people, the CPU 15 retrieves, from the storage section 12, any questions corresponding to the contents of the questionnaire which the request signal represents, and creates those questions of the questionnaire, shown in FIG. 7 (Step S103).

Then, the CPU 15 sends, to the target people, the created questions each with an identifier corresponding to each of the target people, in the form of an email (Step S104).

Each of the target people then controls the answering terminal 3 to receive the email from the agent server 1. After this, each of the target people operates the answering terminal 3, and forwards a completed questionnaire with a corresponding identifier to the agent server 1 in the form of an email (a reply email).

The CPU 15 of the agent server 1 sequentially stores the reply email, which is sent one after another from each of the answering terminal 3, in the storage section 12 (Step S105).

After this, the CPU 15 detects if there is a person who has done an improper act, such as sending a plurality of reply emails, etc., with using the identifier affixed to each person (Step S106). Specifically, the CPU 15 discriminates whether there are completed questionnaires with the same identifier, thereby to detect whether there is a user having done an improper act.

In the case where it is detected that there is such a person who has done an improper act (Step S106; YES), the CPU 15 deletes those reply emails sent from the person (Step S107), and executes the procedure of the following step S108.

On the contrary, in the case where it is detected that there is no such a person who has done an improper act (Step S106; NO), the CPU 15 sums up the contents of the reply emails stored in the storage section 12 (Step S108).

Subsequently, the CPU 15 creates a reporting page for reporting a summed result of the questionnaires (Step S109).

The CPU 15 sends the created reporting page to the client terminal 2 (Step S110), so as to complete the questionnaire process.

Upon reception of the reporting page sent from the agent server 1, the CPU 25 of the client terminal 2 creates transfer data necessary for transferring the rates for the questionnaire process from the account of the client to the account of the agent. At this time, the CPU 25 creates the transfer data using the rate information, which is sent from the agent server 1 upon request of the questionnaire process. The CPU 25 sends the created transfer data to the settlement terminal 4.

The settlement terminal 4 transfers the charged rates for the questionnaire process from the account of the client to the account of the agent, in accordance with the transfer data sent from the client terminal 2.

Under the control of the CPU 25 of the client terminal 2, the display section 23 displays the reporting page shown in FIG. 4B so as to show the result of the questionnaires to the client. In the reporting page, there may be prepared a button "Select" for selecting a display format of the summed result, from a plurality of display formats, so that the client can select a desired display format. In this case, the plurality of display formats includes types of graphs, such as a vertical bar graph, a horizontal bar graph, a line graph, a pie graph, etc.

As described above, the CPU 15 of the agent server 1 executes the questionnaire process and sums up the completed questionnaires, thus eliminating the need of labor power. The CPU 15 of the agent server 1 creates the questions and sets the target people. Hence, the questions and the target people can fairly be set, without being biased. This realizes a reliable research on a particular people's behavior. Having performed the questionnaire process through the network 5, including the Internet, etc., the requesting and executing the questionnaire process and the displaying the summed result can be performed in a short period of time.

The system of the present invention can be realized using a general-purpose computer, without using a dedicated device. For example, a program and data for controlling the computer to execute the above-described process are recorded on a recording medium (an FD, a CD-ROM, a DVD, etc.), installed into the computer from the medium stored therein. The program is run on an OS to realize the system of the present invention. The program and data may be stored into a disk device included in the server device on the Internet, and embodied in a carrier wave, for example, so as to be transmitted and downloaded into the computer.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-123233 filed on Apr. 24, 2000, and including specification, claims, drawings and summary. The disclosure of the above Japanese Patent Application is incorporated herein by reference in its entirety.

What is claimed is:

1. A computer implemented agent in a client server environment, comprising:

a question making unit configured to formulate at least one question in accordance with contents of a questionnaire received from a client;

an automated setting unit configured to select target people to be provided with said at least one question, said selection of target people is performed in accordance with the contents of the questionnaire;

a questioning unit configured to send the at least one question formulated by said question making unit to the target people identified by the automated setting unit, wherein the at least one question is sent through a network to the target people;

a summing unit configured to sum up responses returned by the respective target people through the network in response to said at least one question; and a providing unit configured to provide through a network, the client with a sum result of said responses.

2. The computer implemented agent of claim 1, wherein said automated setting unit includes:

a condition determiner which determines at least one condition for setting the target people to be provided with the at least one question, in accordance with the contents of the questionnaire; and a target-people determiner which determines the target people, in accordance with the at least one condition determined by said condition determiner.

3. The computer implemented agent of claim 2, wherein:

said target-people determiner sets a code, for identifying each of the determined target people, to each of the target people; and said summing unit performs accurate summing of the completed at least one question, by checking, with the code, whether there is a person having done an improper act.

4. The computer implemented agent of claim 2, further comprising a memory which stores, as data, at least one attribute of a person to be set as one of the target people, and wherein said condition determiner determines, as a condition, the at least one attribute of the target people, in accordance with the contents of the questionnaire, and said target-people determiner determines a predetermined number of people as the target people, of people corresponding to the condition determined by said condition determiner, using the data stored in the memory.

5. A method for executing a questionnaire process in a client server environment, said method comprising:

automatically identifying and selecting target people to be provided with at least one question, said identification and selection of said target people being done by a server in accordance with contents of the questionnaire requested by the client and sent through a network;

obtaining at least one question corresponding to the contents of the questionnaire, from a plurality of questions stored in advance in a memory;

sending data representing the obtained question to a predetermined terminal through a network to question the set of target people;

summing up responses in response to said at least one question using data representing the responses received from the respective ones of the target people through a network; and sending data representing a summed result of the responses to a predetermined terminal through a network, to provide the summed result to the client.

6. The method according to claim 5, wherein said selecting and identifying of target people includes:

determining at least one attribute, as a condition, of the target people, in accordance with the contents of the questionnaire; and sampling a predetermined number of people, as the target people, from a plurality of people having an attribute corresponding to the condition, using attribute information representing attributes of the plurality of people and stored in advance in a memory.

7. The method according to claim 6, wherein:

said sampling includes setting a code, for identifying each of the target people, to each of the target people; and said summing includes performing accurate summing of the responses, by checking, with the code, whether there is a person having done an improper act.

8. An agent system for executing a questionnaire process for a client on a computer in a client agent environment, comprising:

an agent server device for executing the questionnaire process for the client; and a request device which sends a request signal representing contents of a questionnaire requested by the client to said agent device, and wherein said agent device includes an automated setting unit identifying and selecting target people to be provided with at least one question, said identification and selection of target people performed in accordance with contents of the questionnaire represented by a request signal sent from said request device through a network;

a question making unit for formulating at least one question toward the target people set by said setting unit, in accordance with the contents of the questionnaire;

a questioning unit configured to send at least one question made by said question making unit to the target people identified and selected by said setting unit through the network;

a summing unit which sums up responses sent from the target people through a network in response to said at least one question; and a provider which provides said request device with a summed result of the responses through the network.

9. The system according to claim 8, further comprising a controller which controls an account of the client and an account of an agent which owns the agent device, and wherein:

said request device includes a sending unit which sends a transfer signal for instructing to transfer rates for the questionnaire process to said controller from the account of the client to the account of the agent, in response to the summed result sent from said provider; and said controller transfers the rates from the account of the client to the account of the agent, in accordance with the transfer signal sent from the sending unit.

10. A computer program product for enabling a computer to function as an agent device for executing a questionnaire process for a client comprising:

software instructions for enabling the computer to perform predetermined operations, and a computer readable medium bearing the software instructions;

the predetermined operations including the steps of:

identifying and selecting target people to be provided with at least one question, said identification and selection performed in accordance with contents of the questionnaire which are requested by the client through a network;

making said at least one question toward the target people identified and selected, in accordance with the contents of the questionnaire;

sending the question made to the target people identified and selected in accordance with the contents of the questionnaire requested by a client through the network;

summing up responses sent respectively from the target people through the network in response to said at least one question; and providing the client with a summed result obtained upon summing the responses received through a network.

11. A computer implemented agent in a client server environment, wherein the computer implemented agent is configured to execute a questionnaire process for a client, comprising:

a communications interface configured to obtain contents of a questionnaire requested by a client;

a storage section storing people's attributes and characteristics;

a processing unit configured to select target people based on matching the contents of a questionnaire with people's characteristics stored in the storage unit, and a display unit configured to provide the client with a sum result of the responses from the target people sent through the network in response to at least one question, wherein said processing unit generates and sends said at least one question based on the contents of questionnaire to the target people, and wherein said processing unit sums up the responses returned by the respective target people through the network.

12. The computer implemented agent set forth in claim 11, wherein said processing unit randomly selects from the target people a predetermined number of people to whom said at least one question is to be sent.

13. The computer implemented agent set forth in claim 11 further comprising a settlement terminal configured to transfer rates from account of a client to an account of an agent based on a number of the responses.

* * * * *